(12) United States Patent
Vonnahme et al.

(10) Patent No.: US 11,528,164 B2
(45) Date of Patent: Dec. 13, 2022

(54) METHOD FOR OPERATING A NETWORK SUBSCRIBER AND NETWORK SUBSCRIBER

(71) Applicant: Beckhoff Automation GmbH, Verl (DE)

(72) Inventors: Erik Vonnahme, Salzkotten (DE); Thorsten Bunte, Gütersloh (DE); Benjamin Koch, Paderborn (DE)

(73) Assignee: Beckhoff Automation GmbH, Verl (DE)

(*) Notice: Subject to any disclaimer, the term of this patent is extended or adjusted under 35 U.S.C. 154(b) by 130 days.

(21) Appl. No.: 16/921,058

(22) Filed: Jul. 6, 2020

(65) Prior Publication Data

US 2020/0336333 A1 Oct. 22, 2020

Related U.S. Application Data

(63) Continuation of application No. PCT/EP2019/082285, filed on Nov. 22, 2019.

(30) Foreign Application Priority Data

Nov. 26, 2018 (DE) ..................... 10 2018 129 774.2

(51) Int. Cl.
*H04L 12/40* (2006.01)
*H04L 5/00* (2006.01)
(Continued)

(52) U.S. Cl.
CPC ...... *H04L 12/40071* (2013.01); *H04L 5/0044* (2013.01); *H04L 5/22* (2013.01);
(Continued)

(58) Field of Classification Search
CPC ... H04L 12/40071; H04L 5/0044; H04L 5/22; H04L 12/40006; H04L 69/08; H04L 12/28; G06F 13/14
See application file for complete search history.

(56) References Cited

U.S. PATENT DOCUMENTS

| | | | |
|---|---|---|---|
| 5,706,001 A | | 1/1998 | Sohn |
| 6,049,540 A | * | 4/2000 | Chrin .................... H04Q 11/06 370/376 |

(Continued)

FOREIGN PATENT DOCUMENTS

| | | |
|---|---|---|
| AT | 517778 T | 8/2011 |
| CN | 1526102 A | 9/2004 |

(Continued)

OTHER PUBLICATIONS

Hardware Data Sheet, EtherCAT Slave Controller, Beckhoff, dated Feb. 21, 2017, retrieved from: https://download.beckhoff.com/download/document/io/ethercat-development-products/ethercat_esc_datasheet_sec1_technology_2i3.pdf (Year: 2017).*

(Continued)

*Primary Examiner* — Nishant Divecha
(74) *Attorney, Agent, or Firm* — Dorsey & Whitney LLP

(57) ABSTRACT

A method of operating a network subscriber comprises receiving an input-data stream containing an input-transmission frame according to a field-bus protocol, where the input-data stream is received in chronologically successive data units having a defined processing width, decoding fields of the input-transmission frame by a plurality of field-processing units arranged in series, each field-processing unit decoding a predetermined field of the input-transmission frame, and generating an output-data stream comprising an output transmission frame according to the field-bus protocol from the input-data stream.

14 Claims, 3 Drawing Sheets

(51) Int. Cl.
*H04L 5/22* (2006.01)
*H04L 12/28* (2006.01)
*H04L 69/08* (2022.01)

(52) U.S. Cl.
CPC ........ *H04L 12/28* (2013.01); *H04L 12/40006* (2013.01); *H04L 69/08* (2013.01)

(56) References Cited

U.S. PATENT DOCUMENTS

| | | | |
|---|---|---|---|
| 8,416,770 B2* | 4/2013 | Fourcand | H04L 12/413 370/242 |
| 8,824,333 B2* | 9/2014 | Balasubramanian | H04L 12/40032 370/254 |
| 10,193,705 B2* | 1/2019 | Janssen | H04L 12/403 |
| 2006/0268999 A1 | 11/2006 | Konz et al. | |
| 2012/0057479 A1* | 3/2012 | Maruyama | H04J 3/0667 370/252 |
| 2013/0173868 A1* | 7/2013 | Leyrer | H04L 12/40013 711/152 |
| 2015/0295727 A1* | 10/2015 | Bunte | H04L 51/063 370/390 |
| 2015/0365252 A1* | 12/2015 | Bunte | H04L 12/6418 709/208 |
| 2021/0157293 A1* | 5/2021 | Sawada | G05B 19/054 |

FOREIGN PATENT DOCUMENTS

| | | |
|---|---|---|
| CN | 102523145 A | 6/2012 |
| CN | 105103562 A | 11/2015 |
| CN | 108476206 A | 8/2018 |
| DE | 102004063213 A1 | 6/2006 |
| DE | 102014105207 A1 | 10/2015 |
| DE | 102014106019 A1 | 10/2015 |
| DE | 102014112082 A1 | 2/2016 |
| WO | 2014162750 A1 | 10/2014 |

OTHER PUBLICATIONS

A powerpoint slide on EtherCAT, the Ethernet Fieldbus, retrieved from web archive with date of Jul. 5, 2016 https://web.archive.org/web/20160705185703/https://www.ethercat.org/pdf/english/EtherCAT_Introduction_0905.pdf (Year: 2016).*
EtherCAT Technology Group: EtherCAT—the Ethernet Fieldbus. 2012. URL: https ://www.ethercat.org/pdf/english/ETG Bro chure EN.pdf [abgerufen am Jul. 2, 2019.
International Search Report and Written Opinion dated Jan. 27, 2020 for International Patent Application No. PCT/EP2019/082285, 44 pages including machine translation.
International Preliminary Report on Patentability dated Apr. 24, 2020 for International Patent Application No. PCT/EP2019/082285, 23 pages including machine translation.
Kozanitis, et al. "Leaping multiple headers in a single bound: wire-speed parsing using the Kangaroo system." IEEE, 2010, 9 pages.
Office Action dated Oct. 11, 2021 in connection with Chinese patent application No. 201980020837.3, 9 pages including English translation.
Decision on Appeal dated May 17, 2010 in connection with Appeal 2009-001300, 10 pages.

* cited by examiner

METHOD FOR OPERATING A NETWORK SUBSCRIBER AND NETWORK SUBSCRIBER

CROSS REFERENCE TO RELATED APPLICATIONS

This application is a continuation of International Patent Application No. PCT/EP2019/082285, filed 22 Nov. 2019, entitled METHOD FOR OPERATING A NETWORK PARTICIPANT, AND NETWORK PARTICIPANT, which claims priority to German Patent Application No. 10 2018 129 774.2, filed 26 Nov. 2018, entitled VERFAHREN ZUM BETREIBEN EINES NETZWERKTEILNEHMERS UND NETZWERKTEILNEHMER, each of which is incorporated by reference herein, in the entirety and for all purposes.

FIELD

The present invention relates to a method for operating a network subscriber and a to network subscriber.

BACKGROUND

Various field-bus protocols are known from the prior art. With such field-bus protocols, data are usually transmitted in transmission frames which have different fields for address, control and status information, user data and backup information. When processing such a transmission frame in a network subscriber, the individual fields are identified at the receiving end and the data contained therein is extracted. On the transmitter side, data for the fields in the transmission frame is merged and formatted before the transmission frame is transmitted.

The physical transmission of a transmission frame in the form of a data stream may take place via a defined interface, which transmits the data stream with a defined signal width and at a defined signal rate. In order to achieve a transmission rate of 100 Mbps, the transmission may, for example, take place with a signal width of 4 bits and a signal rate of 25 MHz. In the network participants, the transmission frames are usually processed with the same width and frequency as is the case with transmission via the physical interface. However, the processing frequency cannot be increased as desired by available hardware such as FPGAs, ASICs and processors.

SUMMARY

The present invention provides a method for operating a network subscriber and a network subscriber.

EXAMPLES

A method of operating a network subscriber comprises receiving an input-data stream containing an input-transmission frame according to a field-bus protocol, wherein the input-data stream is received in successive data units having a fixed processing width, decoding fields of the input-transmission frame by a plurality of field-processing units arranged one after the other, each field-processing unit decoding a defined field of the input-transmission frame, and generating, from the input-data stream, an output-data stream containing an output-transmission frame according to the field-bus protocol.

Advantageously, this method allows for parallel decoding of a plurality of fields of the input-transmission frame. This makes it possible to select the processing width of the data units so large that one data unit contains several fields or parts of several fields of the input-transmission frame. The large processing width thus enabled allows the input-data stream to be transmitted at a high transmission rate.

In an embodiment of the method, fields are decoded while the input-transmission frame is being received. Thus, the method allows for the input-transmission frame received with the input-data stream to be processed while passing through, i.e. already during receipt of the input-transmission frame. As a result, the input-transmission frame may be processed with a considerably lower latency than would be possible in a procedure in which the input-transmission frame is first received in full and processed only then.

In an embodiment of the method, a first one of the field-processing units detects a start of the input-transmission frame. Then, start positions of fields of the input-transmission frame are determined depending on a position of the start of the input-transmission frame. Advantageously, the method thereby allows for processing of the input-transmission frame contained in the input-data stream even if the input-transmission frame starts at any position in one of the data units received in chronological sequence.

In an embodiment of the method, each start position comprises a number of a data unit and an index within the data unit. In this context, the method makes use of the fact that the sequence and width of many fields of the input-transmission frame is defined in the field-bus protocol and the start position of these fields may thus be easily calculated, advantageously depending on the position of the start of the input-transmission frame in one of the data units. The start positions of other fields of the input-transmission frame may be calculated depending on the start position and the length of the preceding fields of the input-transmission frame.

In an embodiment of the method, decoding a field of the input-transmission frame in a second of the field-processing units comprises reading out an information. The information may be, for example, a header-data information of the input-transmission frame, such as a target address. The information may e.g. also be a command directed to the network subscriber or a date to be processed by the network subscriber.

In an embodiment of the method, the second field-processing unit logically links the information to the output-data stream. This allows for manipulating the output-data stream depending on the information read from the field of the input-transmission frame.

In an embodiment of the method, the information is temporarily stored in a register stage before being linked to the output-data stream. Advantageously, logic paths between the processing of the input-data stream and the processing of the output-data stream are decoupled as a result.

In an embodiment of the method, the second field-processing unit passes the information on to a third field-processing unit following the second field-processing unit. Advantageously, the third field-processing unit is thereby enabled to process the field of the input-transmission frame decoded by the third field-processing unit depending on the information read out by the second field-processing unit. Thereby, the method allows for taking dependencies between the individual fields of the input-transmission frame into account. A particular advantage of the method is that dependencies between fields received within a single data unit may also be taken into account.

In an embodiment of the method, the second field-processing unit passes the information on to the third field-processing unit as an information bundle together with the input-data stream and the output-data stream. Advantageously, all information required by the third field-processing unit is thereby combined and gathered in the information bundle.

In an embodiment of the method, the information bundle is buffered between the second field-processing unit and the third field-processing unit in a register stage. Advantageously, the combinatorial logic of the second field-processing unit is separated from that of the third field-processing unit. This allows for a time-dependent decoupling of the processing by the second field-processing unit from the processing by the third field-processing unit. As a result, the logic paths required for processing by the field-processing units become shorter, which may provide a higher processing frequency. Since all data and information required by the third field-processing unit are gathered in the information bundle, the intermediate storage of the information bundle between the second field-processing unit and the third field-processing unit does not require any further changes to the third field-processing unit.

In an embodiment, the field-bus protocol used is an EtherCAT® protocol. In this case, the input transmission frame is an EtherCAT® transmission frame. Advantageously, the method makes it possible to transmit EtherCAT® transmission frames at high transmission rates.

In an embodiment of the method, the processing width is 64 bits. Advantageously, with a processing width of 64 bits a transmission rate of 10,000 Mbps may already be achieved at a processing frequency of 156.25 MHz.

A network subscriber is embodied to receive an input-data stream containing an input-transmission frame according to a field-bus protocol in temporally successive data units having a fixed processing width and to generate, from the input-data stream, an output-data stream containing an output-transmission frame according to the field-bus protocol. In this context, the network subscriber comprises a plurality of field-processing units arranged one after the other. Each field-processing unit is embodied to decode a defined field of the input-transmission frame.

Advantageously, said network subscriber allows parallel decoding of several fields of the input-transmission frame. As a result, it is possible to select the processing width of the data units so large that one data unit contains a plurality of fields or parts of a plurality of fields of the input-transmission frame. The resulting large processing width allows the input-data stream to be transmitted at a high transmission rate.

In an embodiment of the network subscriber, a first one of the field-processing units is embodied to detect a start of the input-transmission frame. In this context, the network subscriber is embodied to detect start positions of fields of the input-transmission frame depending on a position of the start of the input-transmission frame. Advantageously, as a result, the network subscriber is able to process the input-transmission frame contained in the input-data stream even if the input-transmission frame starts at any position in one of the data units received in chronological sequence.

In an embodiment of the network subscriber, a second one of the field-processing units is embodied in such a way that decoding a field of the input-transmission frame comprises reading out an information. The information may e.g. be a header information of the input-transmission frame, for example a target address. However, the information may e.g. also be a command directed to the network subscriber or a date to be processed by the network subscriber.

In an embodiment of the network subscriber, the second field-processing unit is embodied to logically link the information to the output-data stream. This makes it possible to manipulate the output-data stream depending on the information read out from the field of the input-transmission frame.

In an embodiment of the network subscriber, a register stage is provided to buffer the information before linking it to the output-data stream. Advantageously, logic paths between the processing of the input-data stream and the processing of the output-data stream are thereby decoupled.

In an embodiment of the network subscriber, the second field-processing unit is embodied to forward the information to a third field-processing unit following the second field-processing unit. Advantageously, the third field-processing unit is thereby enabled to process the field of the input-transmission frame decoded by the third field-processing unit depending on the information read out by the second field-processing unit. As a result, the network subscriber may take dependencies between the individual fields of the input-transmission frame into account. A particular advantage is that dependencies between fields received within a single data unit may also be taken into account.

In an embodiment of the network subscriber, the second field-processing unit is embodied to forward the information together with the input-data stream and the output-data stream to the third field-processing unit as an information bundle. Advantageously, all information required by the third field-processing unit is thus gathered and transferred in the information bundle.

In an embodiment of the network subscriber, a register stage is provided for buffering of the information bundle between the second field-processing unit and the third field-processing unit. Advantageously, the combinatorial logic of the second field-processing unit is thereby separated from that of the third field-processing unit. This allows for time-dependent decoupling of the processing by the second field-processing unit from the processing by the third field-processing unit. As a result, the logic paths required for processing by the field-processing units become shorter, which may provide a higher processing frequency. Since all data and information required by the third field-processing unit are gathered in the information bundle, buffering of the information bundle between the second field-processing unit and the third field-processing unit does not require any further changes to the third field-processing unit.

BRIEF DESCRIPTION OF THE DRAWINGS

The present invention is explained in more detail in conjunction with the accompanying drawings, in which.

DETAILED DESCRIPTION

Figure 1:
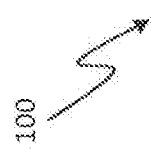
FIG. 1 shows a schematic view of a transmission frame according to a field-bus protocol.

FIG. 1 shows a strongly schematized depiction of a transmission frame 100 of a field-bus protocol. The field-bus protocol may e.g. be an EtherCAT® protocol. However, the field-bus protocol may e.g. also be PROFIBUS or another field-bus protocol.

The transmission frame 100 gathers data and metadata to be transmitted via a field-bus. For this purpose, transmission frame 100 comprises a plurality of fields 110 which are defined in the field-bus protocol. Individual fields 110 of the transmission frame 100 may have a fixed length defined in the field-bus protocol. Other fields 110 of the transmission frame 100 may have a variable length. The sequence of the fields 110 of the transmission frame 100 is defined in the field-bus protocol. However, individual fields 110 of the transmission frame 100 may be repeated, wherein the number of repetitions may be variable.

In the schematic and simplified example in FIG. 1, the transmission frame 100 comprises a first field 110, 111, a second field 110, 112 following the first field 110, 111 and three datagrams 120 following the second field 110, 112 and arranged one after the other. The datagrams 120 are followed by a sixth field 110, 116. The number of three datagrams 120 is chosen as an example only. Only one or two or more than three datagrams 120 may be provided.

Figure 2:
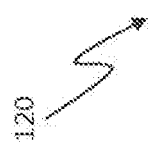
FIG. 2 is a schematic depiction of a datagram of the transmission frame.

FIG. 2 shows a schematic and simplified depiction of one of the datagrams 120 of the transmission frame 100. Each of the datagrams 120 comprises a third field 110, 113, a fourth field 110, 114 following the third field 110, 113 and a fifth field 110, 115 following the fourth field 110, 114.

As the transmission frame 100 shown in FIG. 1 comprises a total of three datagrams 120, the transmission frame 100 has a total of three repetitions of the third field 110, 113, the fourth field 110, 114, and the fifth field 110, 115.

The transmission frame 100 and the datagrams 120 of the transmission frame 100 may have more fields 110 than the first to sixth fields 111, 112, 113, 114, 115, 116 shown in FIGS. 1 and 2.

For example, the first field 110, 111 may contain header data of the transmission frame 100. Such header data may e.g. include a sender address, a target address and a type of transmission frame 100. If the transmission frame 100 is a transmission frame according to the EtherCAT® standard, this header data may e.g. be designed as Ethernet header data. Instead of only one first field 110, 111, several fields 110 could be provided, each containing different header data. These fields may e.g. have lengths of 48 or 16 bits.

The second field 110, 112 of the transmission frame 100 may e.g. have further header data. If the transmission frame 100 is a transmission frame according to the EtherCAT® standard, the second field 110, 112 may, for example, contain EtherCAT® header data. In the example shown, the second field 110, 112 of transmission frame 100 is shorter than the first field 110, 111. The second field 110, 112 may e.g. have a length of 16 bits or, respectively, 2 bytes.

The sixth field 110, 116 of the transmission frame 100 may, for example, contain a checksum which may be used to examine whether transmission frame 100 has been transmitted without errors. The sixth field 110, 116 may e.g. have a length of 32 bits or, respectively, 4 bytes.

The third field 110, 113 of the transmission frame 100 may e.g. contain datagram-header data. Said datagram-header data may e.g. include commands, addresses and length specifications. Again, instead of only one third field 110, 113, several separate fields 110 having different datagram-header data may be provided in the datagrams 120.

The fifth field 110, 115, which in the example shown is the last field 110 of each datagram 120, may e.g. comprise a counter.

In the example shown in FIGS. 1 and 2, the first field 110, 111, the second field 110, 112, the third field 110, 113, the fifth field 110, 115 and the sixth field 110, 116 each have defined lengths which are specified in the field-bus protocol.

The fourth field 110, 114, which is provided in each datagram 120, may, for example, contain user data that are processed by network subscribers in a network operated according to the field-bus protocol. The fourth field 110, 114 may have a variable length which differs for the different datagrams 120 of the transmission frame 100. As a result, the individual datagrams 120 of transmission frame 100 may also have different lengths.

The length of the fourth field 110, 114 may be indicated for each datagram 120 in the exemplary datagram-header data stored in the third field 110, 113 of the respective datagram 120. Accordingly, a correct recognition of the fourth field 110, 114 in each datagram 120 requires a read-out of the information contained in the third field 110, 113 of the respective datagram 120. The datagram-header data of each datagram 120 contained exemplarily in the third field 110, 113 may e.g. also comprise a command specifying how to proceed with the user data contained in the fourth field 110, 114 of the respective datagram 120. Thus, dependencies exist between the individual fields 110 of the transmission frame 100. The processing of individual fields 110 of the transmission frame 100 may depend on information contained in preceding or subsequent fields 110 of the transmission frame 100.

In a data network operated according to the field-bus protocol, for example in an EtherCAT® network, transmission frames 100 are transferred in the form of data streams between network subscribers in the data network. A physical transmission layer (PHY) used herein frequently comprises a defined interface that transmits the data of transmission frame 100 with a defined signal width and signal rate. The mathematical product of the signal width and the signal rate results in the achieved signal-transmission speed. In a 100 Mbps network, for example transmission may take place with a signal width of 4 bits and a signal rate of 25 MHz. In a 10,000 Mbps network, for example, the transmission may take place with a signal width of 32 bits and a signal rate of 156.25 MHz using a double-data-rate transmission method.

In the network subscribers of the network, received transmission frames 100 are processed by identifying the individual fields 110 and extracting the information contained therein. In order to transmit transmission frames 100, the required data are combined and formatted before the transmission frame 100 is sent. Processing of the transmission frame 100 is carried out with a processing width and a processing frequency. The processing width and the processing frequency may correspond to the signal width and the signal rate of the physical interface. The maximum processing frequency, however, is limited by the performance of available hardware such as FPGAs, ASICs and processors. In order to allow for the processing of transmission frames 100 in a network subscriber even at a high signal transmission speed, it may be necessary to increase the processing width in order to reduce the processing frequency accordingly. For example, the processing of the transmission frame 100 in a 10,000 Mbps network may be carried out with a processing width of 64 bits and a processing frequency of 156.25 MHz.

Figure 3:
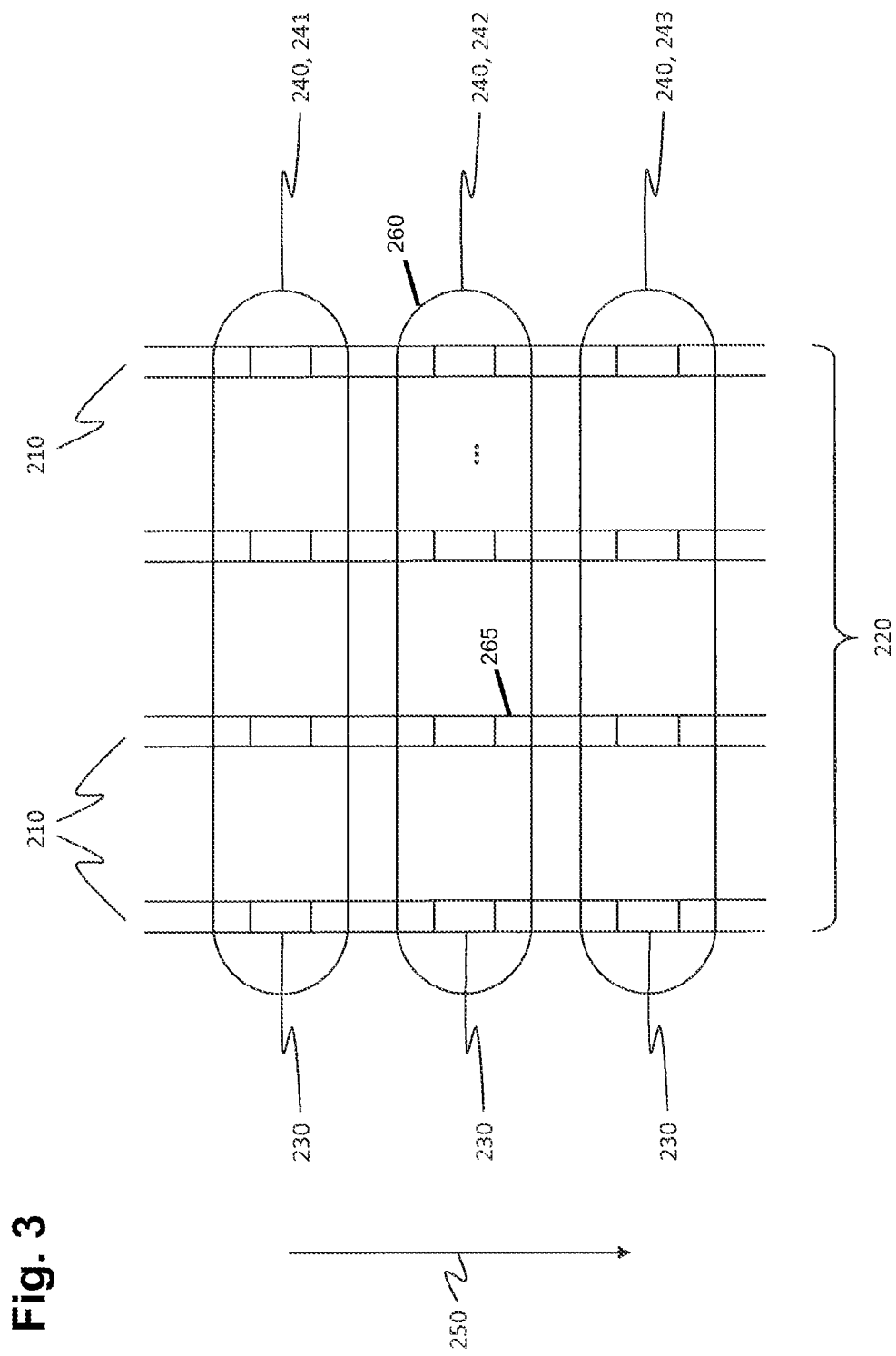
FIG. 3 shows a schematic view of a processing of a data stream with a defined processing width.

However, a large processing width makes it more difficult to process the transmission frames 100, as explained in FIG. 3 below. FIG. 3 shows a plurality of byte lanes 210, via which data units 240 arrive in chronological sequence with a fixed processing width 220. Each data unit 240 comprises a number of bytes 230 corresponding to the number of byte lanes 210. The number of byte lanes 210 or, respectively, the number of bytes 230 per data unit 240 corresponds to the processing width 220. With a processing width 220 of 64 bits, 8 byte lanes 210 exist and each data unit 240 comprises 8 bytes 230, i.e. 64 bits. For the sake of clarity, only four byte lanes 210 are shown in FIG. 3. As symbolically indicated by the arrow 250, the data units 240 arrive one after the other via byte lanes 210. A first data unit 240, 241 is followed by a second data unit 240, 242, this is followed by a third data unit 240, 243 etc.

A transmission frame 100 arriving in the form of the data units 240 may start at any position within a data unit 240, i.e. at any byte 230 of the data unit 240 or on any byte lane 210. However, in this context the start of the transmission frame 100 may be indicated by a preamble preceding the transmission frame 100, which allows for detecting the start of the transmission frame 100.

Individual fields 110 of a transmission frame 100 may have a length that is greater than the processing width 220. In the example of the transmission frame 100 shown in FIGS. 1 and 2, the fourth field 110, 114 may have a length which is greater than the processing width 220. Such a field 110 of the transmission frame 100 then extends over a plurality of chronologically subsequent data units 240. Fields 110 of transmission frame 100, the length of which is shorter than the processing width 220, may also extend over a plurality of chronologically subsequent data units 240, if the field 110 in question only begins near the end of a data unit 240.

Some fields 110 of the transmission frame 100 have a length that is smaller than the processing width 220. As a result, a single data unit 240 may comprise a plurality of chronologically subsequent fields 110 of the transmission frame 100 or at least parts of a plurality of chronologically subsequent fields 110 of a transmission frame 100. In such a case, the fields 110 of transmission frame 100 located in a shared data unit 240 must be processed simultaneously in parallel. This particularly applies if dependencies exist between the fields 110 of transmission frame 100 located in a shared data unit 240.

If the processing width 220 is greater than the minimum length of a datagram 120, a plurality of datagrams 120 of a transmission frame 100 may jointly be comprised by a data unit 240. In this case, this plurality of datagrams 120 must also be processed in parallel. However, if the transmission frame 100 is an EtherCAT® transmission frame and the processing width 220 is 64 bit, this case cannot occur as the datagrams 120 in EtherCAT® transmission frames have a minimum length that exceeds 64 bit.

Figure 4:
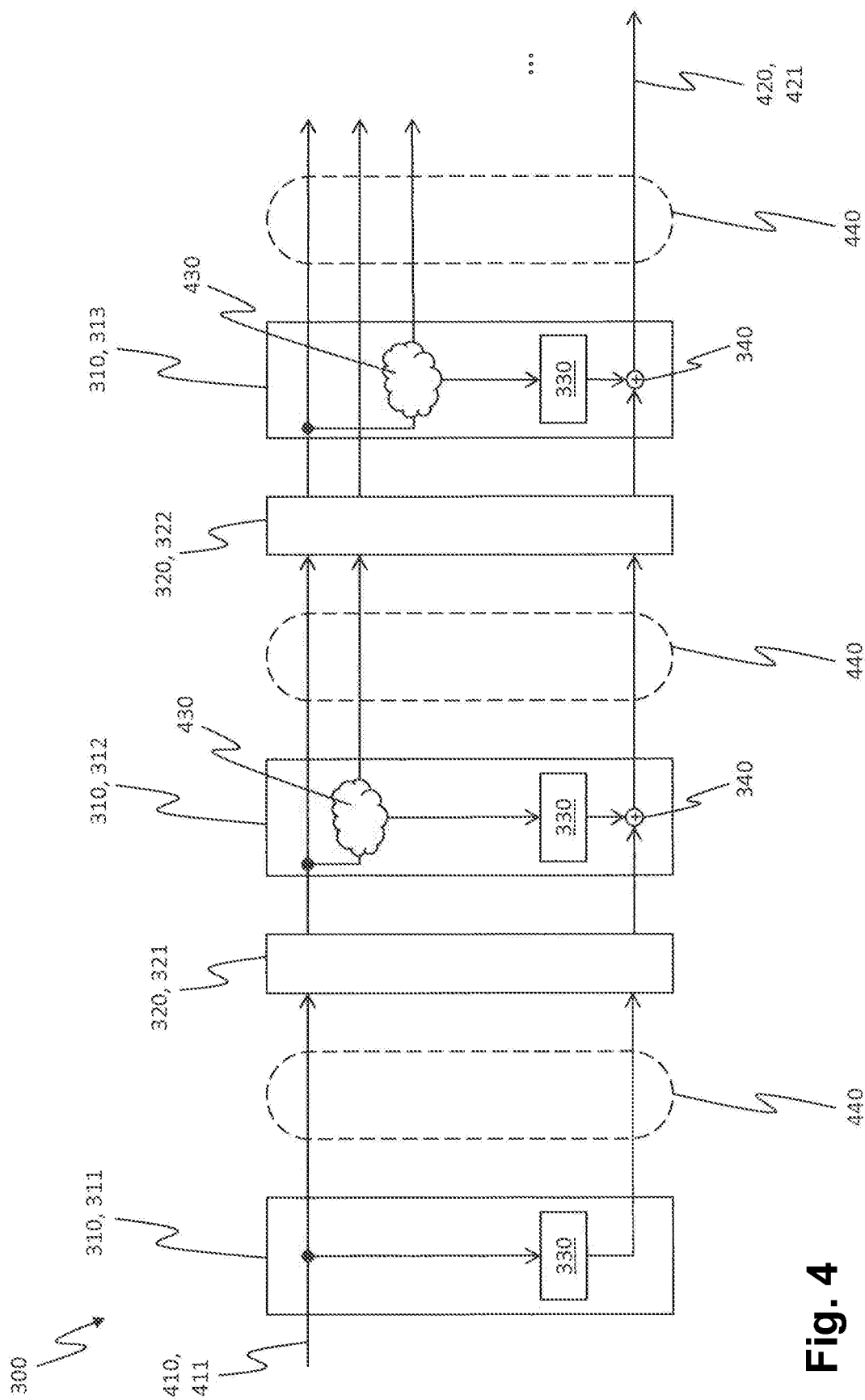
FIG. 4 is a schematic depiction of a network subscriber.

FIG. 4 shows a very strongly schematized depiction of a network subscriber 300. The network subscriber 300 is intended for use in a data network operated according to the field-bus protocol. The network subscriber 300 is embodied to process an input-data stream 410 and to generate an output-data stream 420 from the input-data stream 410. In this context, the input-data stream 410 has input-transmission frames 100, 411 according to the field-bus protocol, which are therefore embodied like the transmission frame 100 shown schematically in FIG. 1. The output-data stream 420 is generated with output transmission frames 100, 421, which also correspond to the field-bus protocol and are accordingly embodied like the transmission frame 100 of FIG. 1. In the following, the processing of an input-transmission frame 100, 411 received with the input-data stream 410 by the network subscriber 300 is described.

As described above in conjunction with FIG. 3, which shows a plurality of byte lanes 210, via which data units 240 arrive in chronological sequence with a fixed processing width 220, the input-data stream 410 of FIG. 4 arrives in chronologically successive data units 240, which each have the processing widths 220.

The network subscriber 300 has a plurality of field-processing units 310 arranged one after the other. At least some of these field-processing units 310 are designed to decode a predefined field 110 of the input-transmission frame 100, 411 in each case. The number of field-processing units 310 of the network subscriber 300 may therefore be as large or larger than the number of different fields 110 of the transmission frames 100 of the field-bus protocol.

In the example shown schematically in FIG. 4, the network subscriber 300 has a first field-processing unit 310, 311, a second field-processing unit 310, 312 arranged subsequent to the first field-processing unit 310, 311 and a third field-processing unit 310, 313 arranged subsequent to the second field-processing unit 310, 312. In most variants, however, the network subscriber 300 will have more than three field-processing units 310.

In addition, the network subscriber 300 may have more field-processing units 310 for other purposes. For example, the first field-processing unit 310, 311 of the network subscriber 300 may be embodied to detect a start of the input-transmission frame 100, 411 received with the input-data stream 410. The detection of the start of the input-transmission frame 100, 411 may e.g. be carried out by detecting a preamble preceding the input-transmission frame 100, 411.

The decoding of the fields 110 of the input-transmission frame 100, 411 takes place while the input-transmission frame 100, 411 is still being received with the input-data stream 410. The processing of the input-transmission frame 100, 411 by the network subscriber 300 is thus carried out in a continuous process without the input-transmission frame 100, 411 being completely received before its processing.

The output-data stream 420 with the output transmission frame 100, 421 is generated by the network subscriber 300 from the input-data stream 410 comprising the input-transmission frame 100, 411. For this purpose, the first field-processing unit 311 transfers the data units 240 received with the input-data stream 410 to the output-data stream 420. Thus, at the level of the first field-processing unit 311, the output-data stream 420 corresponds to the input-data stream 410. The field-processing units 310 arranged after the first field-processing unit 310, 311 may modify the output-data stream 420.

Between the field-processing units 310 of the network subscriber 300, information bundles 440 are passed on. The information bundles 440 comprise the input-data stream 410 and the output-data stream 420. In addition, the information bundles 440 comprise information 430 obtained from the field-processing units 310, e.g. information 430 read out when decoding the fields 110 of the input-transmission frame 411.

The first field-processing unit 310, 311 of the network subscriber 300 is embodied to detect the beginning of the input-transmission frame 100, 411 in an incoming data unit 240. The beginning of the input-transmission frame 411 simultaneously represents the beginning of the first field 110, 111 of the input-transmission frame 100, 411.

If the length of the first field 110, 111 of the input-transmission frame 100, 411 is determined, the start position of the second field 110, 112 may also be determined from the start position of the first field 110, 111 of the input-transmission frame 100, 411. This correspondingly applies for the further fields of the input-transmission frame 110, 411. The information necessary for this is also passed on between the field-processing units 310 of the network subscriber 300 as part of the information bundles 440. The start position of a field 110 of the input-transmission frame 100, 411 may, for example, comprise a number 260 of the data units 240 arriving at the network subscriber 300 and an index 265 within the data unit 240, i.e. indicating the number of the byte lane 210 as shown in FIG. 3.

In the case of fields 110 of the input-transmission frame 100, 411, which have a variable length, in the example explained using FIGS. 1 and 2 e.g. the fourth field 110, 114, the start position of the following field 110 may be determined using length information transmitted in further fields 110 of the input-transmission frame 100, 411. In this case, the necessary information is also transmitted between the field-processing units 310 of network subscriber 300 as part of information bundle 440.

The second field-processing unit 310, 312 and the third field-processing unit 310, 313 of the network subscriber 300 are each embodied to decode a predetermined field 110 of the input-transmission frame 100, 411. The decoding of the respective field 110 of the input-transmission frame 100, 411 in these field-processing units 310, 312, 313 in each case comprises reading out an information 430 from the corresponding field 110 of the input-transmission frame 100, 411. The second field-processing unit 310, 312 of the network subscriber 300 may e.g. be embodied to decode the first field 110, 111 of the input-transmission frame 100, 411 and thereby obtain a first information 430, 431. The third field-processing unit 310, 313 may e.g. be embodied to decode the second field 110, 112 of the input-transmission frame 100, 411 and thereby obtain second information 430, 432. The read-out information 430 is passed on by the field-processing units 310 to the subsequent field-processing units 310 as part of the information bundle 440.

Register stages 320 in which the information bundles 440 are buffered may be arranged between the field-processing units 310 of the network subscriber 300. In the shown example, a first register stage 320, 321 is arranged between the first field-processing unit 310, 311 and the second field-processing unit 310, 312. A second register stage 320, 322 is arranged between the second field-processing unit 310, 312 and the third field-processing unit 310, 313.

The register stages 320 divide up the combinatorial logic of the individual field-processing units 310 of the network subscriber 300 and thus decouple the processing by the individual field-processing units 310 in time. This shortens the individual logic paths of the network subscriber 300. This allows for operating the network node 300 at a higher processing frequency.

However, the register stages 320 may also be omitted. It is also possible to operate register stages 320 between only some of the field-processing units 310, but to pass on the information bundles 440 between other field-processing units 310 of the network subscriber 300 without intermediate register stages 320.

The register stages 320 may be implemented as parts of the field-processing units 310. For example, the first register stage 320, 321 may be implemented as part of the second field-processing unit 310, 312 and the second register stage 320, 322 may be implemented as part of the third field-processing unit 310, 313.

The field-processing units 310 of the network subscriber 300 may also be embodied to logically combine information 430 obtained by decoding the fields 110 of the input-transmission frame 100, 411 with the output-data stream 420 in order to cause a modification of the output-data stream 420 comprising the output-transmission frame 100, 421. In the schematic depiction in FIG. 4, this is indicated by logical links 340.

In addition to the optional register stages 320, 300 further register stages may be provided at the network subscriber 300 which cause a clock delay in order to wait for the read data during read accesses carried out by the network node 300.

In each field-processing unit 310, a further register stage 330 may be provided between the paths for the input-data stream 410 and the output-data stream 420 which decouples the respective logic paths. This makes it possible to perform read and write accesses which require two separate accesses. The delays required for this could, however, also be provided elsewhere in the network subscriber 300. Then, the further register stages 330 may be omitted.

The invention has been described in detail by preferred exemplary embodiments. Instead of the described exemplary embodiments, other exemplary embodiments are conceivable, which can comprise further modifications or combinations of described features. For this reason, the invention is not limited by the disclosed examples since a person skilled in the art can derive other variations therefrom, without having to depart from the scope of protection of the invention.

The advantageous designs and extensions of the invention described above and/or reproduced in the subclaims can be applied individually or else in any combination with each other—except, for example, in cases of clear dependencies or incompatible alternatives.

The invention claimed is:

1. A method for operating a network subscriber, comprising:
    receiving an input-data stream including an input-transmission frame according to a field-bus protocol,
    wherein the input-data stream is received in chronologically successive data units having a predetermined processing width;
    decoding fields of the input-transmission frame by a plurality of field-processing units arranged one after the other,
    wherein each of the plurality of field-processing units decodes a predetermined field of the input-transmission frame; and
    generating an output-data stream including an output transmission frame according to the field-bus protocol from the input-data stream;
    wherein a second field-processing unit of the plurality of field-processing units decoding a field of the input-transmission frame comprises reading out information;
    wherein the second field-processing unit passes on the information to a third field-processing unit of the plurality of field-processing units, following the second field-processing unit, arranged after the second field-processing unit in the plurality of field-processing units; and
    wherein the second field-processing unit passes on the information together with the input-data stream and the output-data stream to the third field-processing unit as an information bundle.

2. The method according to claim 1, wherein the decoding of fields is carried out while receiving the input-transmission frame.

3. The method according to claim 1,
    wherein a first field-processing unit of the plurality of field processing units detects a start of the input-transmission frame, and
    wherein start positions of fields of the input-transmission frame are determined depending on a position of the start of the input-transmission frame.

4. The method according to claim 3, wherein each start position comprises a number of a data unit and an index within the data unit.

5. The method according to claim 1, wherein the second field-processing unit logically links the information read out in decoding the field to the output-data stream.

6. The method according to claim 5, wherein the information is buffered in a register stage before being linked to the output-data stream.

7. The method according to claim 1, wherein the information bundle is buffered in a register stage between the second field-processing unit and the third field-processing unit.

8. The method according to claim 1, wherein the field-bus protocol is configured according to an EtherCAT® protocol, wherein the input-transmission frame is configured according to an EtherCAT® protocol transmission frame.

9. The method according to claim 1, wherein the processing width is 64 bits.

10. The network subscriber according to claim 1, wherein a register stage is provided for storing the information bundle between the second field-processing unit and the third field-processing unit.

11. A network subscriber comprising a plurality of field-processing units and configured to:
receive an input-data stream comprising an input-transmission frame according to a field-bus protocol in chronologically successive data units having a fixed processing width, and
to generate an output-data stream from the input-data stream, the output-data stream comprising an output transmission frame according to the field-bus protocol,
wherein the plurality of field-processing units are arranged one after the other, each of the plurality of field-processing units being configured to decode a predetermined field of the input-transmission frame;
wherein a second field processing unit of the plurality of field-processing units is configured in such a way that decoding a field of the input-transmission frame includes reading out information;
wherein the second field-processing unit is configured to pass on the information to a third field-processing unit of the plurality of field processing units, following the second field-processing unit, arranged after the second field-processing unit in the plurality of field-processing units; and
wherein the second field-processing unit is configured to pass on the information together with the input-data stream and the output-data stream to the third field-processing unit as an information bundle.

12. The network subscriber according to claim 11, wherein a first field-processing unit of the plurality of field processing units is configured to detect a start of the input-transmission frame, and
wherein the network subscriber is configured to determine start positions of fields of the input-transmission frame depending on a position of the start of the input-transmission frame.

13. The network subscriber according to claim 11, wherein the second field-processing unit is configured to logically combine the information read out in decoding the field with the output-data stream.

14. The network subscriber according to claim 13, wherein a register stage is provided to buffer the information before being linked to the output-data stream.

* * * * *